US009144777B2

(12) United States Patent
Brawley (10) Patent No.: US 9,144,777 B2
(45) Date of Patent: Sep. 29, 2015

(54) AEROSOL CAN MIXING DEVICE (71) Applicant: Nicholas Joseph Brawley, Fenton, MO (US)

(72) Inventor: Nicholas Joseph Brawley, Fenton, MO (US)

(73) Assignee: Nicholas Joseph Brawley, Saint Louis, MO (US)

( * ) Notice: Subject to any disclaimer, the term of this patent is extended or adjusted under 35 U.S.C. 154(b) by 493 days.

(21) Appl. No.: 13/629,539

(22) Filed: Sep. 27, 2012

(65) Prior Publication Data
US 2014/0084551 A1    Mar. 27, 2014

(51) Int. Cl.
*B01F 13/00* (2006.01)
*B01F 9/00* (2006.01)
*B01F 15/00* (2006.01)

(52) U.S. Cl.
CPC .............. *B01F 9/0016* (2013.01); *B01F 9/003* (2013.01); *B01F 13/0028* (2013.01); *B01F 15/0074* (2013.01); *Y10T 279/17* (2015.01); *Y10T 279/17897* (2015.01); *Y10T 279/17991* (2015.01); *Y10T 279/32* (2015.01)

(58) Field of Classification Search
CPC ...... B01F 9/0014; B01F 9/0018; B01F 9/003; B01F 9/0016

USPC .................................................. 366/130, 213
See application file for complete search history.

(56) References Cited

U.S. PATENT DOCUMENTS

| | | | | |
|---|---|---|---|---|
| 2,944,799 | A * | 7/1960 | Larson | 366/57 |
| 3,330,537 | A | 7/1967 | Wason | |
| 3,430,927 | A * | 3/1969 | Pouzar | 366/213 |
| 4,318,622 | A * | 3/1982 | Sterrenberg | 366/110 |
| 4,420,262 | A * | 12/1983 | Sterrenberg | 366/110 |
| 5,098,193 | A | 3/1992 | Christensen | |
| 5,704,711 | A * | 1/1998 | Simmons | 366/199 |
| 6,213,631 | B1 * | 4/2001 | Miranda | 366/130 |
| 6,684,922 | B1 * | 2/2004 | Alston et al. | 141/375 |
| 7,997,787 | B2 | 8/2011 | Blair | |
| D665,643 | S | 8/2012 | Brinton | |

* cited by examiner

*Primary Examiner* — Charles Cooley
*Assistant Examiner* — Marc C Howell (57) ABSTRACT

An apparatus is provided that is configured for attachment to an aerosol can to permit mixing of contents therein. The apparatus includes a generally flat base portion coupled to a drive shaft orthogonally oriented relative to the base portion, and a securing strap attached to the base portion. The securing strap is configured to engage or grip a cylindrical end portion of an aerosol can to secure the aerosol can to the apparatus, whereby the drive shaft is configured to be mounted within a drill chuck to permit the mixing apparatus to rotate an aerosol can attached thereto for mixing contents within the aerosol can.

10 Claims, 14 Drawing Sheets

AEROSOL CAN MIXING DEVICE

FIELD

The present application relates to devices for mixing the contents of aerosol cans, and more specifically to devices for mixing paint cans.

BACKGROUND

This section provides background information related to the various embodiments disclosed in the present disclosure, which is not necessarily prior art.

Conventional aerosol spray cans of various typed experience the effect of settling of contents within the can after a period of storage, and require subsequent mixing of the contents prior to use. Most paint shakers now available are specialized and costly to the average homeowner, who infrequently has a need to mix the contents of an aerosol paint can and cannot justify the expense and storage space required for a specialized paint shaking or mixing machine. Several devices have been developed for utilizing a common homeowner tool to mix paint, but such devices are unwieldy and cumbersome to use.

SUMMARY

This section provides a general summary of the disclosure, and is not a comprehensive disclosure of its full scope or all of its features.

Exemplary embodiments of the present disclosure include various embodiments of an apparatus are provided that are configured for attachment to an aerosol can to permit mixing of contents therein. The apparatus includes a generally flat base portion coupled to a drive shaft orthogonally oriented relative to the base portion, and a securing strap attached to the base portion. The securing strap is configured to engage or grip a cylindrical end portion of an aerosol can to secure the aerosol can to the apparatus, whereby the drive shaft is configured to be mounted within a drill chuck to permit the mixing apparatus to rotate an aerosol can attached thereto for mixing contents within the aerosol can, In another aspect of the present disclosure, an apparatus is provided that includes a base portion comprising a generally cylindrical sidewall orthogonal to the base portion, defining an opening therein for receiving the cylindrical end portion of an aerosol can, Further areas of applicability will become apparent from the description provided herein. The description and specific examples in this summary are intended for purposes of illustration only and are not intended to limit the scope of the present disclosure

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Further aspects of the various embodiments will be understood from the following description.

In various embodiments of the present disclosure, an apparatus is provided for attachment to an aerosol can to permit mixing of contents therein. The various embodiments comprise an apparatus that generally includes a generally flat base portion coupled to a drive shaft orthogonally oriented relative to the base portion, and a securing strap attached to the base portion. The securing strap is configured to engage or grip a cylindrical end portion of an aerosol can to secure the aerosol can to the apparatus, whereby the drive shaft is configured to be mounted within a drill chuck to permit the mixing apparatus to rotate an aerosol can attached thereto for mixing contents within the aerosol can, as explained below.

Figure 1:
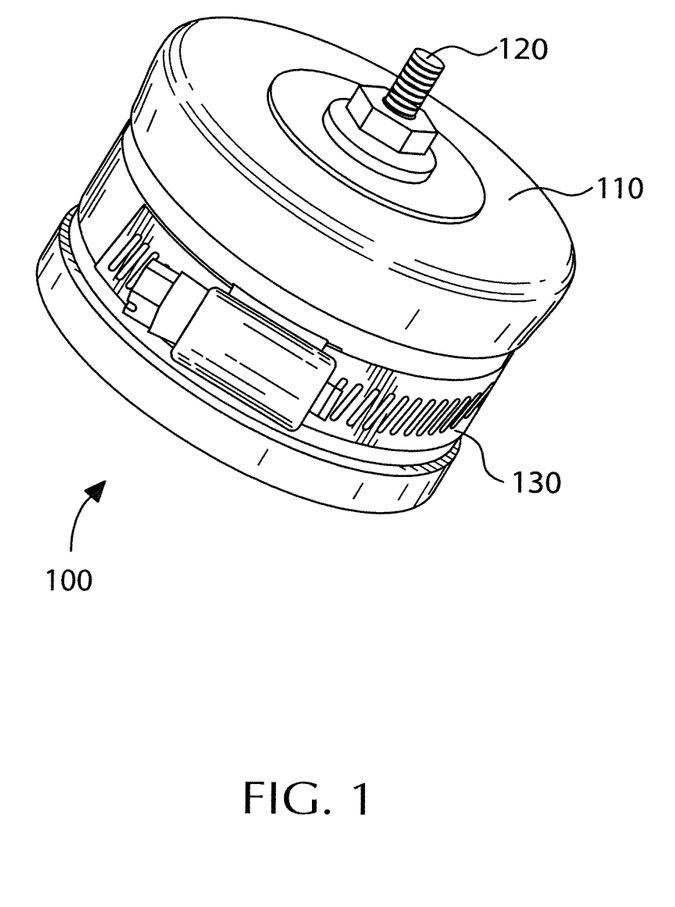
FIG. 1 is a bottom perspective view of a first embodiment of an apparatus for attachment to an aerosol can, according to the present application.

Referring to FIG. 1, a first embodiment of an apparatus 100 for attachment to an aerosol can to permit mixing of contents is provided as shown generally at 100. The apparatus includes a generally flat base portion 110 coupled to a drive shaft 120 orthogonally oriented relative to the base portion 110. The apparatus 100 includes a securing strap 130 attached to the base portion 110, as described below.

The base portion 110 shown in FIG. 1 is made of a flexible material, and comprises a generally circular shape. The base portion 110 of the apparatus is flexible enough to accommodate different sizes of aerosol cans.

Figure 2:
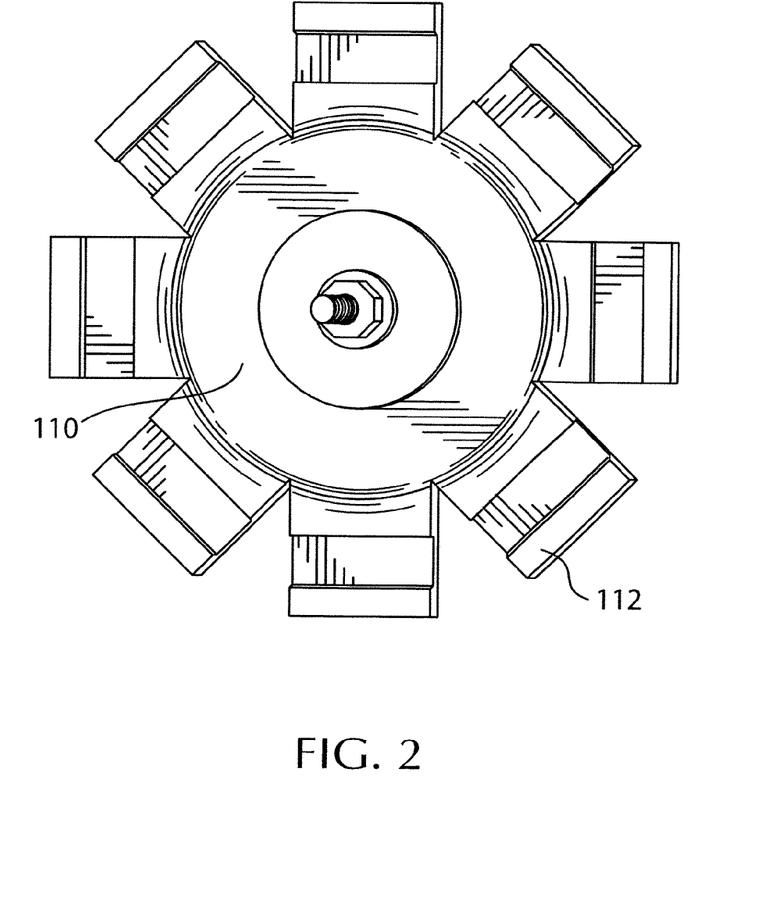
FIG. 2 is a perspective view of a base portion of an apparatus for attachment to an aerosol can, in accordance with the present application.

This is accomplished by constructing the device using material flexible enough to stretch around the aerosol can circumference, Referring to FIG. 2, the base portion 110 has a plurality of radially extending fingers 112 depending from the base portion 110 that are configured to grip around the cylindrical end portion of an aerosol can. The plurality of radially extending fingers 112 of the base portion 110 allow the base portion 1100 to flex outward or contract inward to ensure a secure grip on the can.

Figure 6:
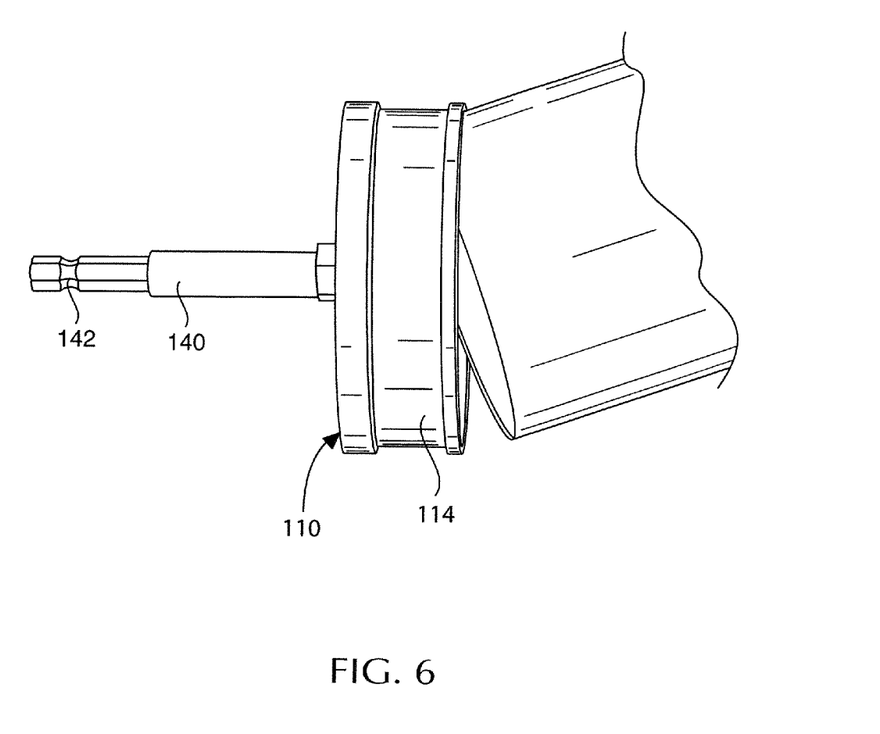
FIG. 6 is a side perspective view of an alternate embodiment of an apparatus with a base portion including cylindrical sidewalls defining an opening for receiving the end of an aerosol can.

Alternatively, instead of the plurality of radially extending fingers, the base portion 110 may further comprise a generally cylindrical sidewall 114 orthogonal to the base portion 110 (without any slits), as shown in FIG. 6. The cylindrical sidewall 114 defines an opening therein for receiving the cylindrical end portion of an aerosol can. The base portion 110 and sidewall 114 may be integrally formed of rubber, and when secured by the securing strap 130 creates a snug, vacuum like fit to retain the aerosol can within the opening. The opening is sized such that it will receive a number of similarly sized cans that may be secured within the opening to the base portion 110 by the securing strap 130.

Figure 3:
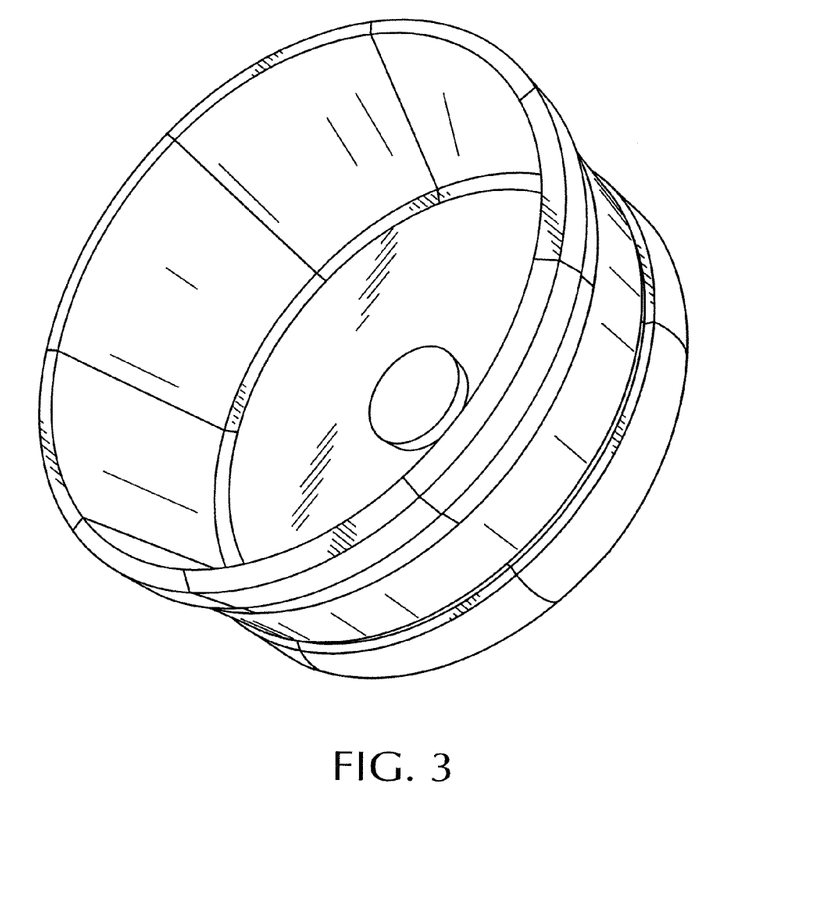
FIG. 3 is a top perspective view of the base portion of the apparatus in FIG. 2.
Figure 7:
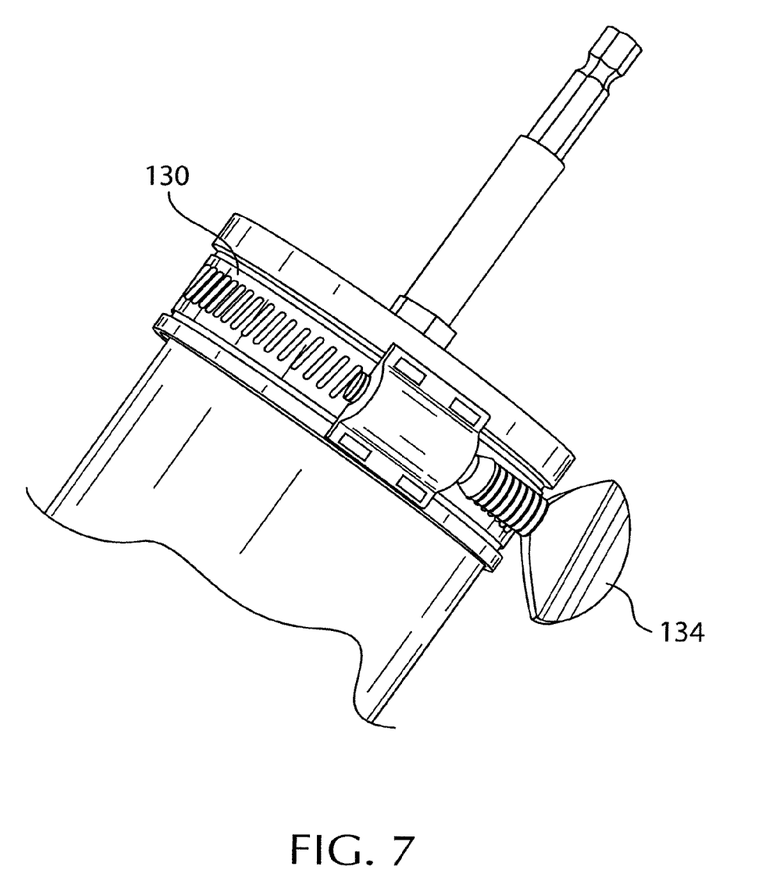
FIG. 7 is a side perspective view of the apparatus n FIG. 6 depicting a securing strap with a thumb screw.
Figure 8:
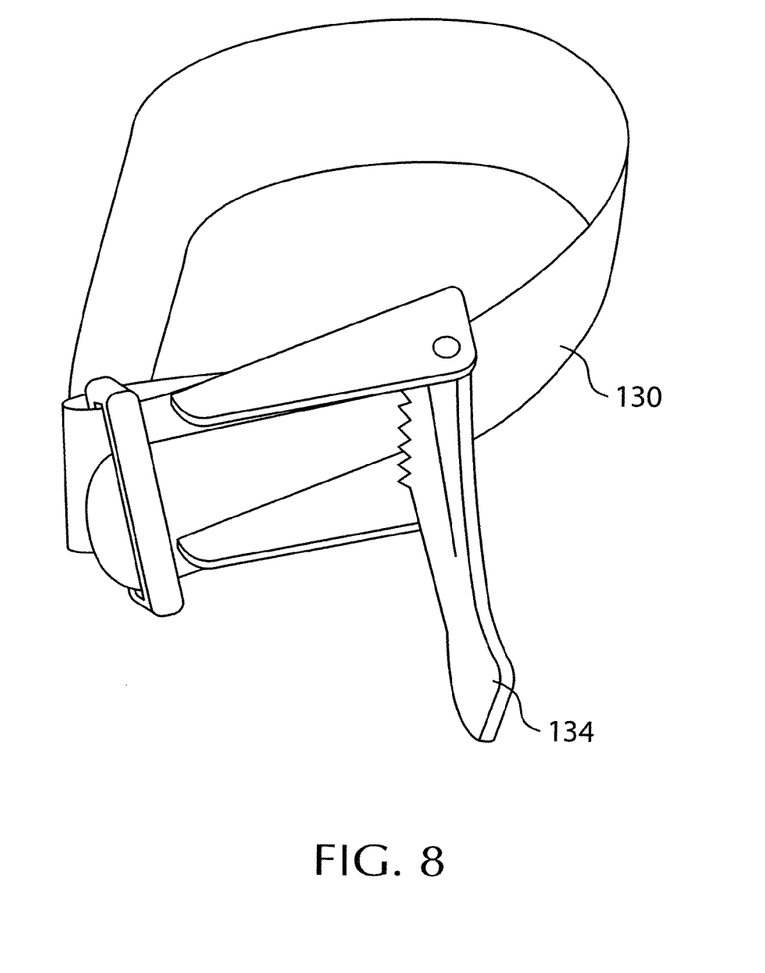
FIG. 8 is a perspective view of an alternate embodiment of a securing strap for use with the apparatus.
Figure 9:
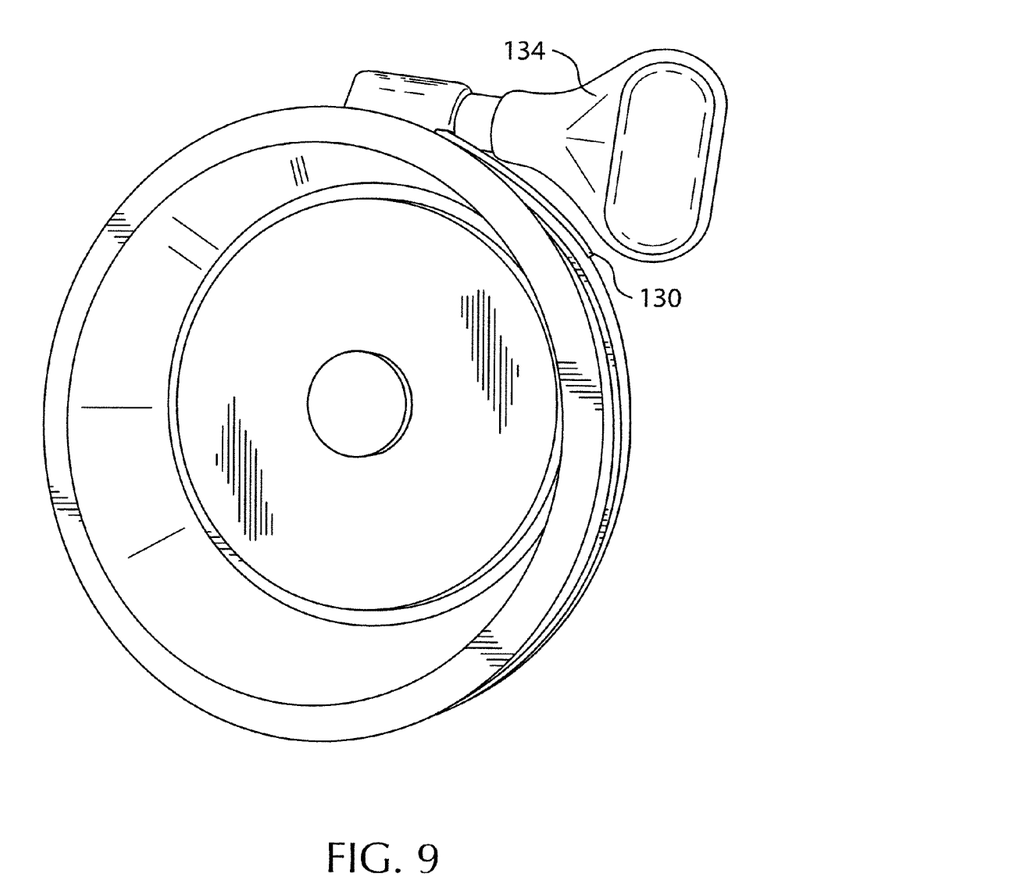
FIG. 9 is a side perspective view of the apparatus in FIG. 6 depicting a securing strap with a rotating lever for tightening the strap.

As shown in FIGS. 1 and 3, the securing strap 130 is configured to engage or grip a cylindrical end portion of an aerosol can to secure the aerosol can to the apparatus. The securing strap 130 preferably comprises a hose clamp strap that is configured to tighten the securing strap against the aerosol can when an adjustment fastener 132 is rotated. Alternatively, the securing strap 130 may comprise a hose clamp strap with a thumb screw 134 that is configured to tighten the securing strap against the aerosol can when the lever 134 is rotated, as shown in FIG. 7. In another alternate construction, the securing strap 130 may comprise a hose clamp with a rotatable lever 134 as shown in FIG. 9, which is configured to rotate a screw for tightening the securing strap 130 around the radially extending fingers 112 (or cylindrical sidewall 114). In other embodiments, the securing strap 130 may be a quick-release adjustable strap including a lever 134 that is configured to tighten the securing strap 130 against the aerosol can when the lever 134 is rotated to a clamping position as shown in FIG. 8.

The drive shaft 120 may be any size shaft of a dimensional size that is appropriate for common electric hand drills. The drive shaft 120 may coupled to the base portion 110 in a generally centered position relative to the base portion 110. Alternatively, the drive shaft 120 may be positioned off center relative to the base portion 110 to produce a wobble effect when rotated. Alternatively, the drive shaft 120 may be a "quick release" hex-shaped drill-bit type shaft 140 commonly seen on powered hand drill accessories, as shown in FIG. 6 The "quick release" hex-shaped drill-bit type drive shaft 140 has a grooved portion 142 for retaining the shaft within a drill chuck.

The drive shaft 120 is coupled to the generally flat base portion 110 by means of a clamp component 140. The clamp component 140 may comprise a washer plate 142 that is secured to the drive shaft 120 via a fastener or threaded nut that secures the drive shaft 120 and washer plate 142 around the base portion 110, as shown in FIG. 3. The plurality of radially extending fingers 112 (or the cylindrical sidewall 114 in FIG. 6) are configured to form a generally cylindrical-shaped opening in which an aerosol is inserted, as shown in FIG. 3.

Figure 4:
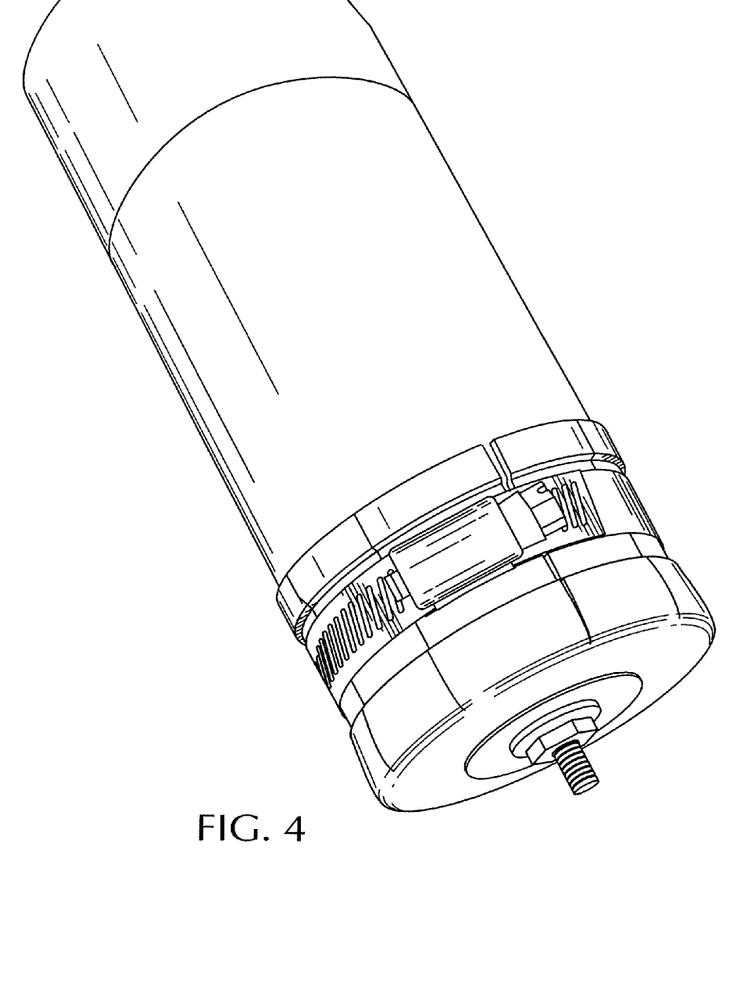
FIG. 4 is a side perspective view of the apparatus shown attached to an aerosol can.
Figure 5:
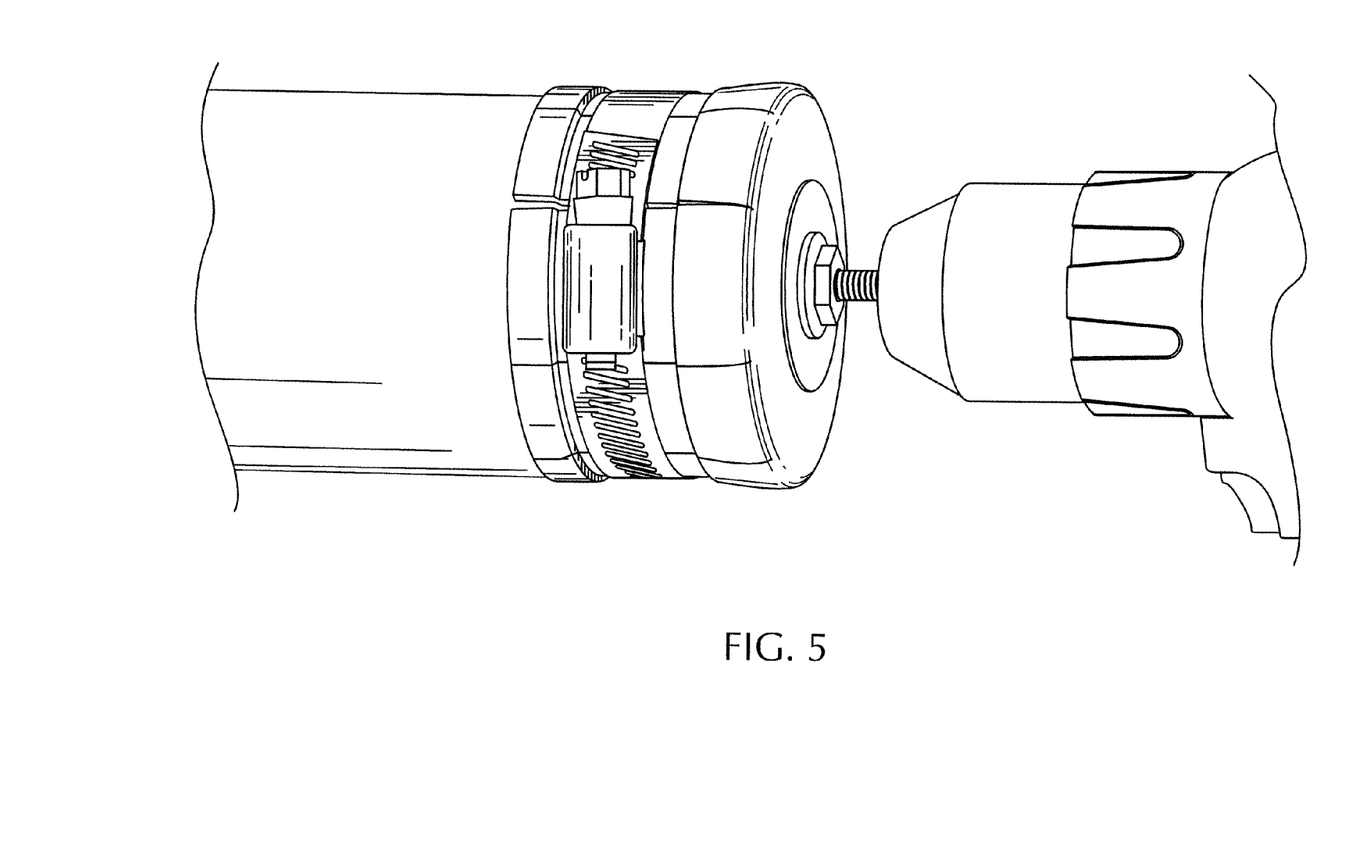
FIG. 5 is a side perspective view of the apparatus shown in FIG. 4 with the drive shaft mounted within a drill chuck of a hand-held drill.

In use, the end of an aerosol can is positioned against to the base portion 110 and the plurality of radially extending fingers 112 are folded against the can in a manner such that the flingers 112 may engage or grip the cylindrical end portion of an aerosol can. A securing strap 130 is attached around the plurality of radially extending fingers 112 of the base portion 110, and is configured to engage and compress the fingers 112 to grip the cylindrical end portion of the aerosol can, as shown in FIG. 4. Once the securing strap 130 has secured the aerosol can to the apparatus 100, the drive shaft is configured to be mounted within a drill chuck as shown in FIG. 5, to permit the mixing apparatus to rotate an aerosol can attached thereto for mixing contents within the aerosol can, as described below.

Figure 10:
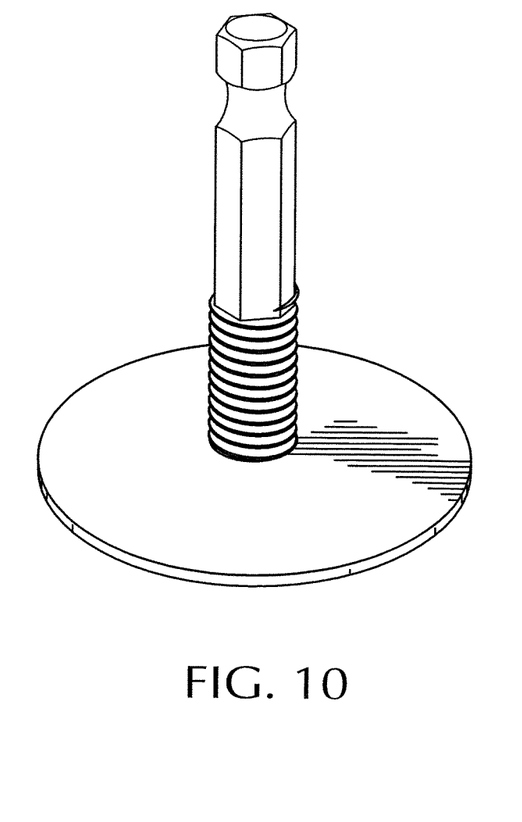
FIG. 10 is a perspective view of a drive shaft and clamp member.
Figure 11:
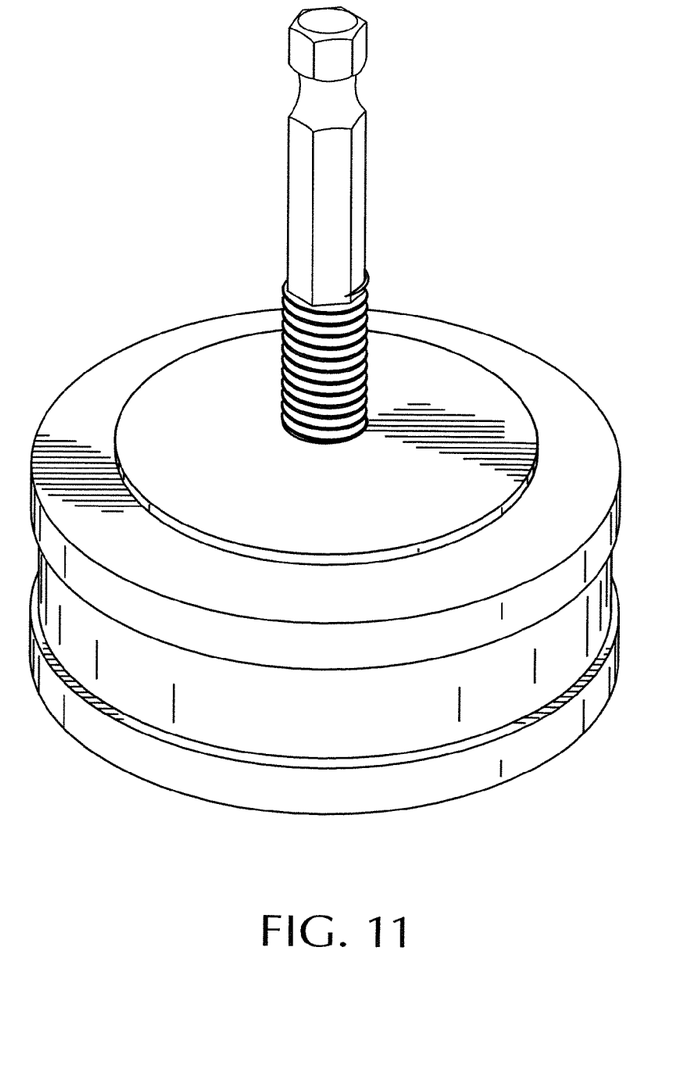
FIG. 11 is a perspective view of a drive shaft and clamp member of he apparatus in FIG. 8 without a nut.
Figure 12:
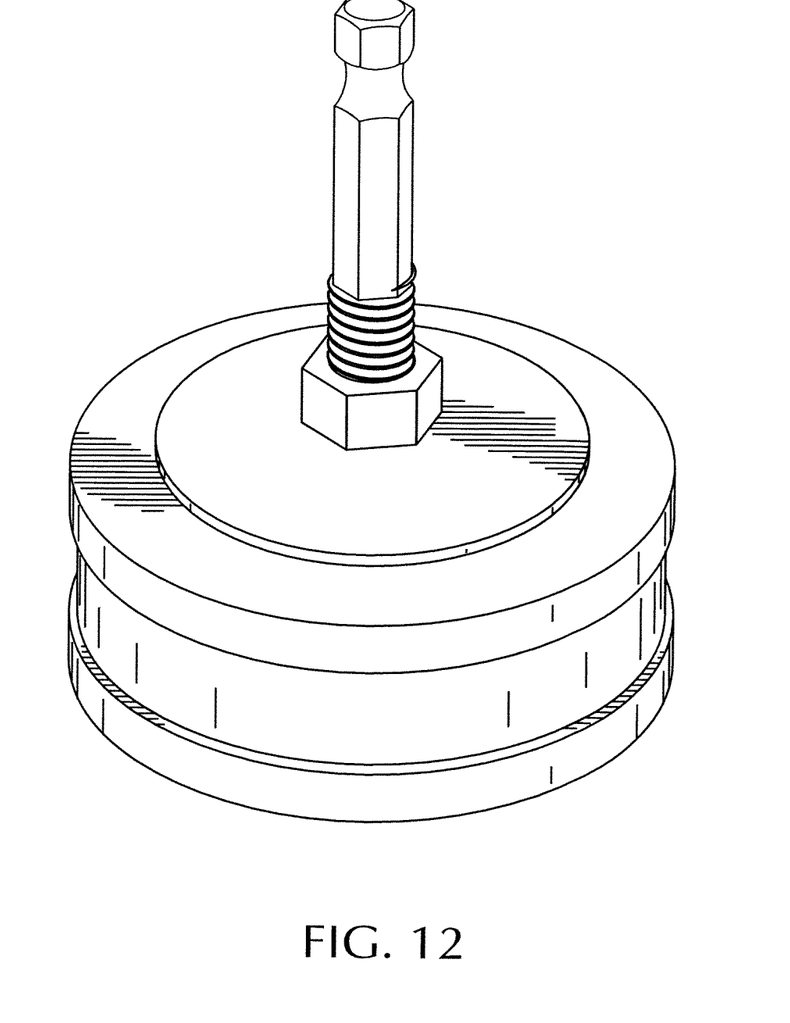
FIG. 12 is a perspective view of the apparatus in FIG. 11 with a nut.
Figure 13:
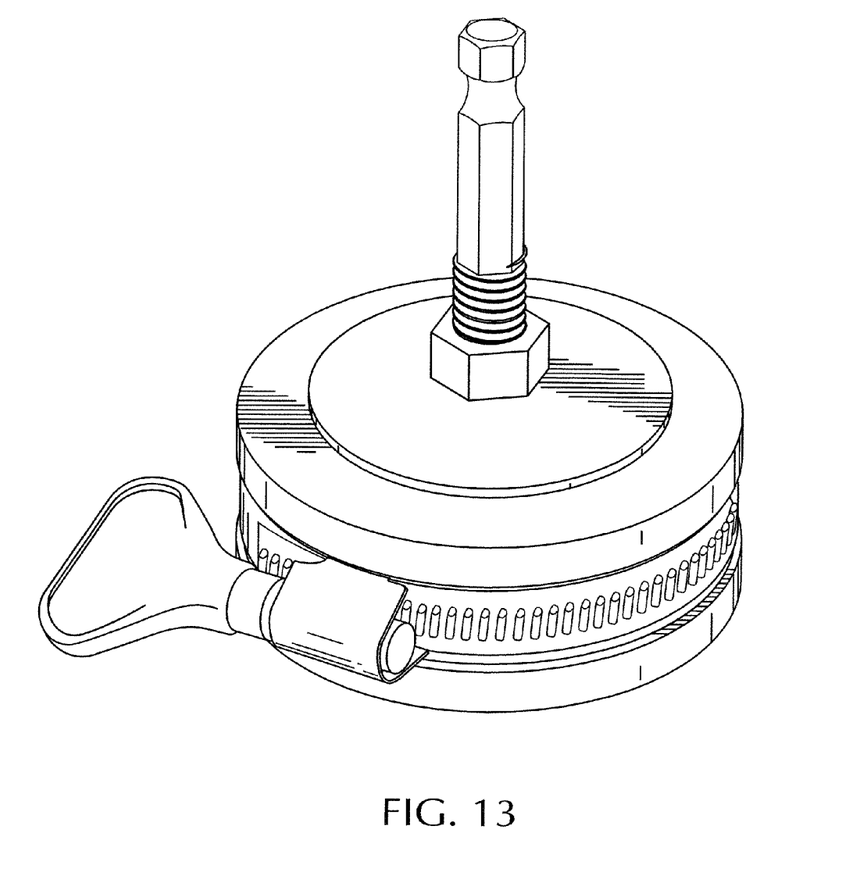
FIG. 13 is a perspective view of the apparatus of FIG. 12.
Figure 14:
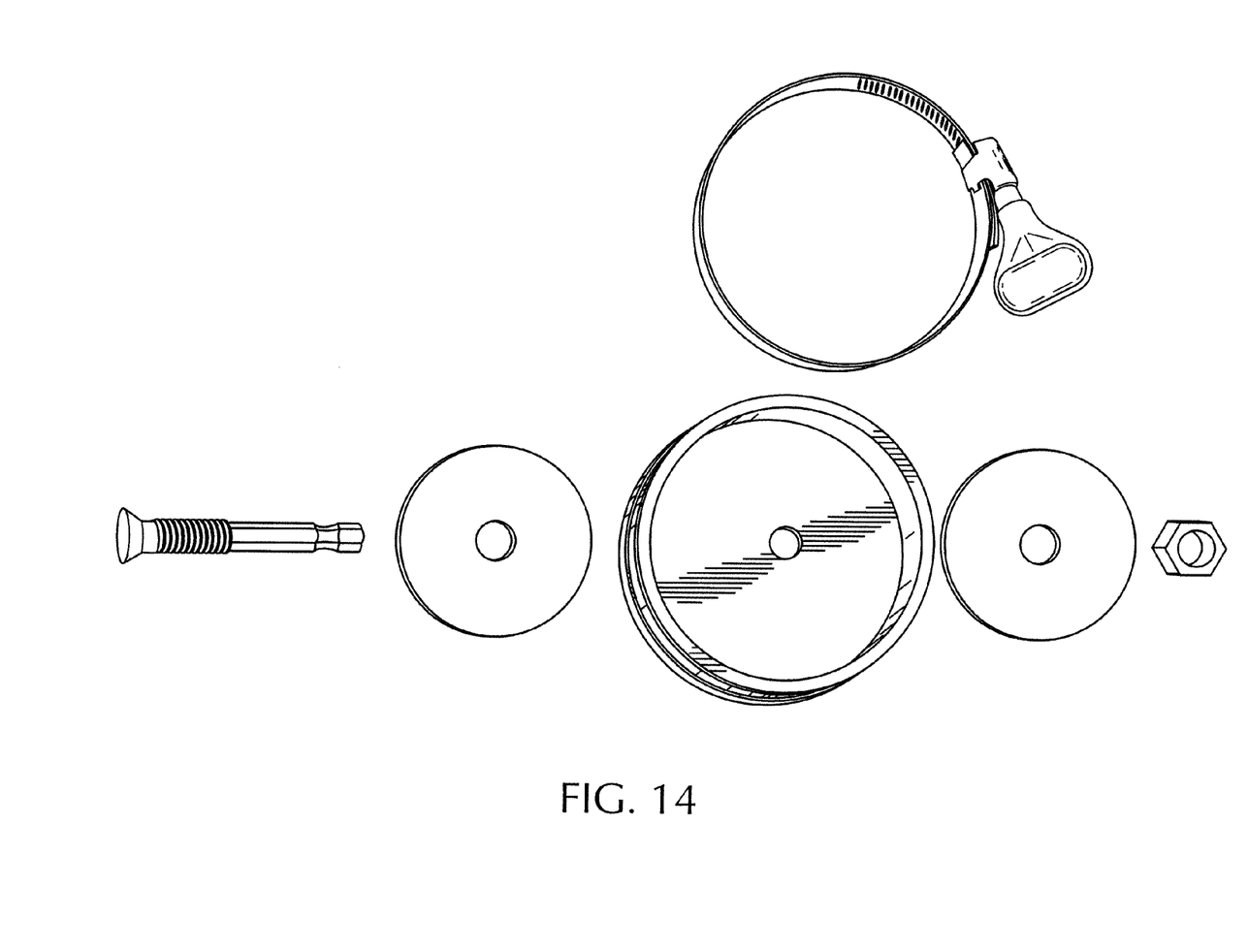
FIG. 14 is an unassembled view of the apparatus of FIG. 13.

Referring to FIGS. 10-14, the drive shaft 120 and clamp component 140 are shown in more detail, The drive shaft 120 includes either left or right handed threads, and a "quick release" hex-shaped drill-bit type shaft 140 commonly seen on powered hand drill accessories, as shown in FIGS. 6 and 10, The clamp component 140 may comprise a washer that is cooperative with the head of the drive shaft 120 for clamping against opposing sides of the base portion 110, as shown in FIG. 11, A fastener such as a nut is threadably secured to the drive shaft 120 to secure the drive shaft 120 and clamp component 140 to the base member 110, as shown in FIG. 12. The apparatus 100 further includes a securing strap 130 as shown in FIG, 13, FIG. 14 shows an unassembled view of the apparatus 100.

The example embodiments above are provided so that this disclosure will be thorough, and will fully convey the scope to those who are skilled in the art, Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed, When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An apparatus configured for attachment to an aerosol can to permit mixing of contents therein, the apparatus comprising:
   a generally flat base portion coupled to a drive shaft orthogonally oriented relative to the base portion,
   a plurality of radially extending fingers depending from the base portion being made of a flexible material;
   a clamp component comprising a washer and a nut threadably secured to threads on the drive shaft to secure the drive shaft and clamp component around the base portion; and
   a securing strap attached around the plurality of radially extending fingers within a groove within the radially extending fingers to engage and compress the fingers to grip a cylindrical end portion of an aerosol can to secure the aerosol can to the apparatus, whereby the drive shaft is configured to be mounted within a drill chuck to permit the mixing apparatus to rotate an aerosol can attached thereto for mixing contents within the aerosol can.

2. The apparatus of claim 1, wherein the securing strap is a quick release strap including a lever that is configured to tighten the strap against the aerosol can when the lever is rotated to a clamping position.

3. The apparatus of claim 1, wherein the securing strap is a hose clamp strap that is configured to tighten the strap against the aerosol can when an adjustment fastener is rotated.

4. The apparatus of claim 1, wherein the base portion and plurality of flexible fingers depending from the base portion of the apparatus is made of a material that is flexible enough to stretch around the aerosol can circumference to ensure a secure grip to accommodate various sizes of aerosol cans.

5. The apparatus of claim 1, wherein the drive shaft of the apparatus is a "quick release" drill-bit type shaft.

6. The apparatus of claim 1, wherein the drive shaft is generally centered relative to the base portion.

7. The apparatus of claim 1, wherein the plurality of radially extending fingers allow the base portion to contract inward to ensure a secure grip on the can.

8. The apparatus of claim 1, further comprising a rotatable lever configured to rotate a screw for tightening the securing strap.

9. The apparatus of claim 1, wherein the drive shaft comprises a hex-shaped drill-bit shaft with a grooved portion for retaining the shaft within a drill chuck.

10. The apparatus of claim 1, wherein the plurality of radially extending fingers fold against an aerosol can in a manner such that the fingers may engage or grip the cylindrical end portion of the aerosol can.

* * * * *